United States Patent
Uesaka et al.

(10) Patent No.: US 12,262,415 B2
(45) Date of Patent: Mar. 25, 2025

(54) SEMI-PERSISTENT CHANNEL STATE INFORMATION REPORTING PROCEDURE WITH UPLINK CLEAR CHANNEL ASSESSMENT

(71) Applicant: Telefonaktiebolaget LM Ericsson (publ), Stockholm (SE)

(72) Inventors: Kazuyoshi Uesaka, Kawasaki Kanagawa (JP); Muhammad Ali Kazmi, Sundbyberg (SE); Iana Siomina, Täby (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 571 days.

(21) Appl. No.: 17/773,727

(22) PCT Filed: Nov. 5, 2020

(86) PCT No.: PCT/SE2020/051066
§ 371 (c)(1),
(2) Date: May 2, 2022

(87) PCT Pub. No.: WO2021/091465
PCT Pub. Date: May 14, 2021

(65) Prior Publication Data
US 2022/0386375 A1    Dec. 1, 2022

Related U.S. Application Data

(60) Provisional application No. 62/932,005, filed on Nov. 7, 2019.

(51) Int. Cl.
*H04W 74/0816*    (2024.01)
*H04L 1/1812*    (2023.01)
(Continued)

(52) U.S. Cl.
CPC ....... *H04W 74/0816* (2013.01); *H04L 1/1812* (2013.01); *H04L 5/0053* (2013.01); *H04W 24/10* (2013.01)

(58) Field of Classification Search
CPC .............. H04W 24/10; H04W 74/0816; H04L 1/1812; H04L 5/0053
See application file for complete search history.

(56) References Cited

U.S. PATENT DOCUMENTS 10,904,895 B2 *   1/2021  Nayeb Nazar .......... H04L 5/001
2019/0174466 A1   6/2019  Zhang et al.
(Continued)

FOREIGN PATENT DOCUMENTS

CN   103490859 A   1/2014
CN   106465336 A   2/2017
(Continued)

OTHER PUBLICATIONS

Chinese Office Action and English translation of the Chinese Office Action dated Jul. 26, 2024 issued in corresponding Chinese Patent Application No. 2020800773713, consisting of 8 pages.
(Continued)

*Primary Examiner* — Elton Williams
(74) *Attorney, Agent, or Firm* — Weisberg I.P. Law, P.A.

(57) ABSTRACT

A method, system and apparatus for semi-persistent channel state information (CSI) reporting procedures with uplink (UL) clear channel assessment (CCA) are disclosed. According to one aspect, a method includes receiving a signal indicating activation or deactivation of semi-persistent channel state information (CSI) reporting and responsive to receiving the signal, attempt to transmit a Hybrid
(Continued)

Automatic Repeat Request Acknowledgement (HARQ-ACK), the attempt being subject to success or failure of a clear channel assessment (CCA). When the CCA fails and when the signal indicates activation, the method includes refraining from CSI measurement and reporting unless CCA subsequently succeeds before expiry of a time interval. When the CCA fails and when the signal indicates deactivation, the method includes continuing CSI measurement but refraining from CSI reporting unless CCA subsequently succeeds before expiry of a time interval.

20 Claims, 14 Drawing Sheets

(51) Int. Cl.
*H04L 5/00* (2006.01)
*H04W 24/10* (2009.01)

(56) References Cited

U.S. PATENT DOCUMENTS

| | | | |
|---|---|---|---|
| 2019/0223161 | A1 | 7/2019 | Muruganathan et al. |
| 2022/0014337 | A1* | 1/2022 | Ouchi ............... H04W 74/0808 |

FOREIGN PATENT DOCUMENTS

| | | |
|---|---|---|
| CN | 107258100 A | 10/2017 |
| CN | 107852611 A | 3/2018 |
| CN | 107852612 A | 3/2018 |
| CN | 108352909 A | 7/2018 |
| CN | 108353312 A | 7/2018 |
| CN | 108702782 A | 10/2018 |
| CN | 110115100 A | 8/2019 |
| WO | 2019092859 A | 5/2019 |

OTHER PUBLICATIONS

3GPP TSG RAN WG1 Meeting #94 R1-1808061 Gothenburg, Sweden, Aug. 20-Aug. 24, 2018; Title: Coexistence and channel access for NR unlicensed band operations; Source: Huawei, HiSilicon; Agenda Item: 7.2.2.4.1; Document for: Discussion and Decision, consisting of 8 pages.

Japanese Office Action and English Summary dated Jun. 20, 2023 for Application No. 2022-525994, consisting of 11 pages.

International Search Report dated Feb. 17, 2021 for International Application No. PCT/SE2020/051066 filed Nov. 5, 2020, consisting of 9 pages.

3GPP TSG RAN WG1 #98bis R1-1910202; Title: Discussion on physical DL channel design in unlicensed spectrum; Source: vivo; Agenda Item: 7.2.2.1.2; Document for: Discussion and Decision; Location and Date: Chongqing, China, Oct. 14-20, 2019, consisting of 10 pages.

3GPP TSG-RAN WG1 #98bis R1-1911243; Title: DL signals and channels for NR-U; Agenda Item: 7.2.2.1.2; Source: Panasonic; Document for: Discussion, Decison; Location and Date: Chongqing, China, Oct. 14-20, 2019, consisting of 11 pages.

3GPP TSG-RAN WG4 Meeting #95-e R4-2007389; Title: L1-RSRP measurements in NR-U; Agenda Item: 6.1.5.11; Source: Ericsson; Document for: Discussion; Location and Date: Electronic Meeting, May 25, 2020-Jun. 5, 2020, consisting of 5 pages.

3GPP TSG RAN WG1 Meeting #103-e R1-2007607; Title: Maintenance on DL signals and channels; Agenda Item: 7.2.2; Source: Huawei, HiSilicon; Document for: Discussion and Decision; Location and Date: E-meeting, Oct. 26, 2020-Nov. 13, 2020, consisting of 5 pages.

3GPP TR 38.889 V16.0.0; 3rd Generation Partnership Project;Technical Specification Group Radio Access Network; Study on NR-based access to unlicensed spectrum (Release 16); Dec. 2018, consisting of 119 pages.

* cited by examiner

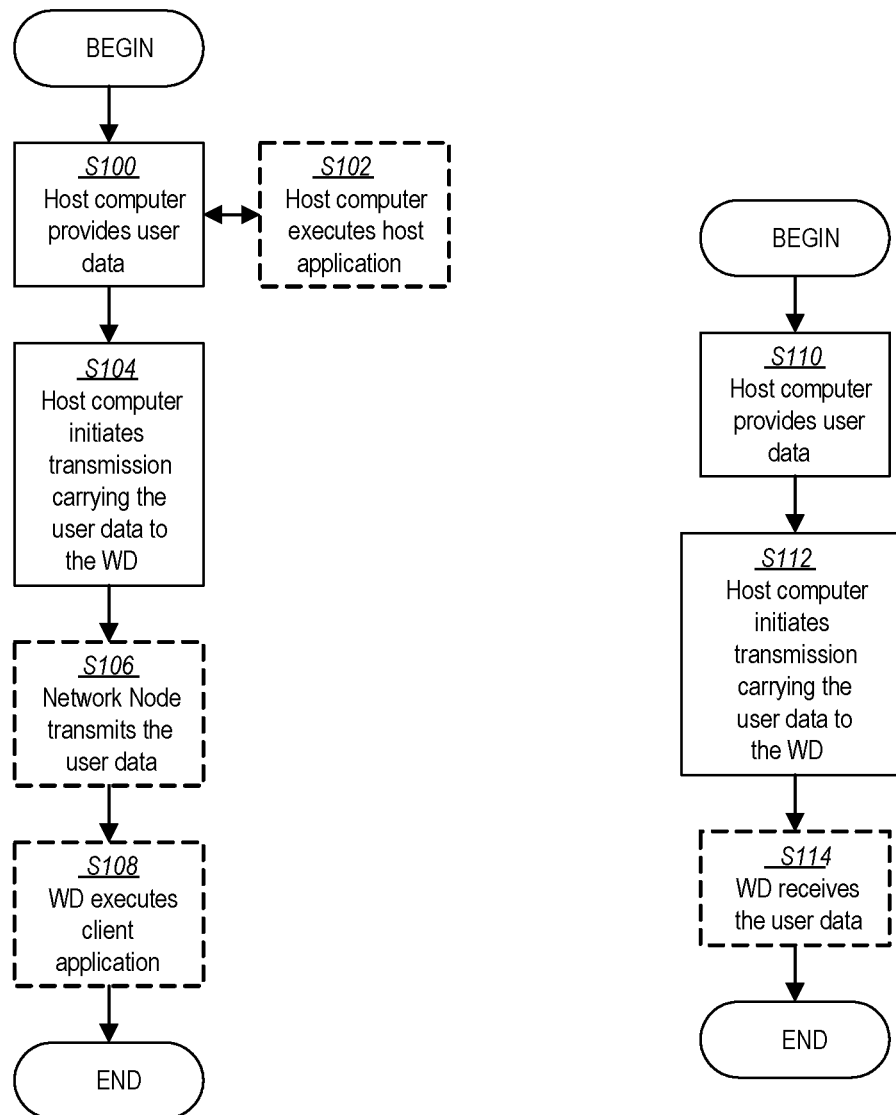

SEMI-PERSISTENT CHANNEL STATE INFORMATION REPORTING PROCEDURE WITH UPLINK CLEAR CHANNEL ASSESSMENT

CROSS-REFERENCE TO RELATED APPLICATIONS

This application is a Submission Under 35 U.S.C. § 371 for U.S. National Stage Patent Application of International Application No.: PCT/SE2020/051066, filed Nov. 5, 2020 entitled "SEMI-PERSISTENT CHANNEL STATE INFORMATION REPORTING PROCEDURE WITH UPLINK CLEAR CHANNEL ASSESSMENT," which claims priority to U.S. Provisional Application No. 62/932,005, filed Nov. 7, 2019, entitled "SEMI-PERSISTENT CHANNEL STATE INFORMATION REPORTING PROCEDURE WITH UPLINK CLEAR CHANNEL ASSESSMENT," the entireties of both of which are incorporated herein by reference.

TECHNICAL FIELD

The present disclosure relates to wireless communications, and in particular, to semi-persistent channel state information (CSI) reporting procedures with uplink (UL) clear channel assessment (CCA).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. NR-U (New Radio Unlicensed or New Radio in unlicensed wireless radio spectrum).

Some parts of the wireless radio spectrum (referred to herein as "spectrum") have become potentially available for license-assisted access (LAA) to unlicensed operation. This spectrum can be used by operators to augment their service offerings in licensed bands by being operated under a license-exempt regime or industrial, scientific and medical (ISM) regime, but must be shared with existing mobile services and other incumbent services. During the NR-U study item by the Third Generation Partnership Project (3GPP), different unlicensed bands or shared bands were considered, such as the 2.4 GHz band, 3.5 GHz band, 5 GHz band, and 6 GHz band.

To access the unlicensed spectrum, unlike licensed spectrum, some countries or regions require a wireless device (WD) to perform a check of the channel occupation by other nodes or systems in advance before signal transmission, which is called clear channel assessment (CCA). 3GPP Long Term Evolution (LTE)-LAA adopts a LBT (Listen-Before-Talk) mechanism for CCA as a baseline for the 5 GHz band. LTE-LAA also adopts LBT as the starting point of the design for the 6 GHz band. At least for bands where absence of Wi-Fi cannot be guaranteed (e.g., by regulation), LBT can be performed in units of 20 MHz.

During LBT, the transmitting node determines whether there are no other transmissions (by performing certain measurements and comparing to a threshold) and if so, it starts COT (Channel Occupancy Time) which does not exceed a maximum COT (MCOT). Note that the maximum COT can vary by region. Otherwise, the transmitting node ceases its transmissions for a certain time period and may retry again later. There are more LBT categories in 3GPP New Radio (NR) (also known as "5G"), and for some categories (Cat2) there are also 16 µs Cat2 and 25 µs Cat2 LBT types, depending on the switching time between the uplink (UL) and the downlink (DL). For example, 16 µs Cat2 means the switching is longer than 16 µs but shorter than 25 µs, and 25 µs Cat2 means 25 µs or longer. In addition, there is also a concept of WD transmissions based on LBT procedure during base station (BS)-initiated COT (i.e., shared COT).

Similar to LTE, NR-U is expected to have discovery signals (DRS) to enable initial access and measurements. LTE DRS contain only primary synchronization signal/secondary synchronization signal/cell specific reference signal (PSS/SSS/CRS), but NR DRS may comprise more signals/channels, e.g., synchronization signal/physical broadcast channel (SS/PBCH) blocks (set of PSS/SSS and PBCH) and channel state information reference signals (CSI-RS) or even some system information.

Channel Access Schemes

FIG. 1 shows an example of LTE LBT and COT, where "s" is the sensing time period. In this figure, if the channel is determined to be busy, after some deferral time, the WD may try again to sense on the channel in order to determine whether the channel is available. If the channel is available, then after some deterministic back off time, the WD may start transmitting an uplink (UL) burst (during the WD's channel occupancy time) but for no longer than the maximum channel occupancy time (MCOT) which can be, e.g., up to 10 ms, depending on the region.

The channel access schemes for NR-based access for unlicensed spectrum can be classified into the following categories:
  Category 1 (Cat 1): Immediate transmission (without LBT) after a short switching gap;
  Category 2 (Cat 2): LBT without random back-off—fixed sensing periodicity;
  Category 3 (Cat 3): LBT with random back-off with a contention window of fixed size; and
  Category 4 (Cat 4): LBT with random back-off with a contention window of variable size.

For different transmissions in a COT and different channels/signals to be transmitted, different categories of channel access schemes can be used. The applicability of the channel access schemes is described, e.g., in the 3GPP Technical Release (TR) 38.889.

Channel access mechanisms for beamformed transmissions have been considered. Support for omni-directional LBT has also been considered. Using directional LBT for beamformed transmissions, i.e., LBT performed in the direction of the transmitted beam has also been considered. Further consideration is required regarding directional LBT and its benefits for beamformed transmissions when the specifications are to be developed, taking into account regulations and fair co-existence with other technologies.

CSI Reporting

CSI reporting is a physical layer WD procedure to report the channel state information (CSI) to the network. CSI includes, e.g., a channel quality indicator (CQI), a precoding matrix indicator (PMI), a rank indicator (RI), a CSI-reference signal indicator (CRI) and an L1-reference signal received power (RSRP). The network may use the information for several purposes. For example, the network, e.g., a network node, may use CQI/PMI/RI for link adaption, where the network chooses the rank and modulation and coding scheme (MCS) so that the WD can receive the maximum physical downlink shared channel (PDSCH) data without error. When the WD is configured to report CRI/L1-RSRP, the network may use this information for beam switching, that is, to determine which beam is to be used to transmit data on the physical downlink control channel (PDCCH) and PDSCH.

The CSI reporting is configured as periodic, aperiodic, or semi-persistent. For periodic reporting, the WD transmits CSI on the physical uplink control channel (PUCCH) according to the periodicity configured by the network. For the aperiodic CSI reporting, the WD transmits CSI on the physical uplink shared channel (PUSCH) only once after the WD receives a CSI request in downlink control information (DCI). For the semi-persistent CSI reporting, the WD transmits CSI reporting on PUSCH or PUCCH according to the periodicity specified by the higher layer. For the semi-persistent reporting, the WD stops CSI reporting after the deactivation command by the network.

When the network requires the semi-persistent CSI report with the PUCCH, the network configures the WD with the reporting item, e.g., CQI and/or L1-RSRP, together with the reporting period. If the network needs the semi-persistent CSI reporting, the network transmits the reporting activation command with a medium access control (MAC) control element (CE) on the PDSCH. When the WD receives the MAC CE, the WD transmits a hybrid automatic repeat request acknowledgment (HARQ-ACK) on the PUCCH or the PUSCH responsive to the PDSCH conveying the MAC CE. The WD then starts the CSI measurement and reporting process, e.g., from 3 ms after the WD transmits HARQ-ACK. If the WD transmits HARQ-ACK on slot n, the WD transmits the CSI reporting with the periodicity of Y slots and offset of X slots, i.e., n+X+Y, n+X+2*Y, n+X+3*Y, etc. If the network wants to stop the ongoing semi-persistence CSI reporting, the network transmits the reporting deactivation command with a MAC CE on the PDSCH. When the WD receives the MAC CE, the WD transmits HARQ-ACK on the PUCCH or the PUSCH responsive to the PDSCH conveying the MAC CE, and then the WD stops CSI measurement and reporting, e.g., at 3 ms after the WD transmits the HARQ-ACK.

When the network requires the semi-persistent CSI report with the PUSCH, the network configures the WD with the reporting item, e.g., CQI, L1-RSRP together with the reporting period. If the network needs the semi-persistent CSI reporting, the network transmits the reporting activation CSI request with DCI on the PDCCH. When the WD receives the CSI request, the WD then starts CSI measurement and reporting, e.g., from 3 ms after the WD decodes the DCI. If the WD is set such that the origin of CSI reporting is slot n, e.g., 3 ms after the DCI decoding, the WD transmits the CSI reporting with the periodicity of Y slots and offset of X slots from slot n, i.e., n+X+Y, n+X+2*Y, n+X+3*Y, etc. If the network wants to stop the ongoing semi-persistence CSI reporting, the network transmits the deactivation CSI request with DCI on the PDCCH. When the WD receives the DCI, the WD then stops CSI measurement and reporting, e.g., at 3 ms after the WD decoded the DCI responsive to the CSI request.

The network node (e.g., the serving cell) may not always receive a CSI report due to the uplink (UL) clear channel assessment (CCA) failure on the WD. The WD may not proceed correctly after the UL CCA failure, or may behave in a different way than expected by the network, since the WD behavior is currently undefined.

MAC CE based activation for semi-persistent CSI reporting requires HARQ-ACK feedback for the PDSCH from the WD. If the WD receives and decodes the PDSCH for the MAC CE, but the WD cannot transmit HARQ-ACK due to UL CCA failure, the WD behavior is currently undefined. When the WD decodes the activation command but cannot transmit HARQ-ACK due to CCA failure, the WD may start CSI measurement, but the WD cannot perform CSI measurement because the network node may not transmit CSI measurement resources since the network node did not receive the HARQ-ACK.

MAC CE based deactivation for semi-persistent CSI reporting requires HARQ-ACK feedback for the PDSCH from the WD. If the WD receives and decodes the PDSCH for the MAC CE, but the WD cannot transmit HARQ-ACK due to UL CCA failure, the WD behavior is currently undefined. When the WD decodes the deactivation command but cannot transmit the HARQ-ACK due to CCA failure, the WD stops CSI measurement, but the network node may continue to transmit CSI measurement resources since the network node does not receive the HARQ-ACK. This unnecessarily consumes the downlink network resources, because the CSI may not be measured by the WD.

SUMMARY

Some embodiments advantageously provide methods, network nodes and wireless devices for semi-persistent channel state information (CSI) reporting procedures with uplink (UL) clear channel assessment (CCA).

Embodiments specify the WD behavior when the WD cannot transmit a HARQ-ACK for MAC CE based semi-persistent CSI reporting activation/deactivation. Embodiments can avoid different WD behavior and also avoid mismatch between the WD and the network node.

In some embodiments, the network node can acquire the latest CSI even though the WD cannot report it due to UL CCA failure. Consequently, the performance of procedures (e.g., scheduling) using CSI reports from the WD is not degraded even due to UL CCA failures.

According to one aspect, a method in a wireless device (WD) includes receiving a signal indicating activation or deactivation of semi-persistent channel state information (CSI) reporting. The method also includes, responsive to receiving the signal, attempting to transmit a Hybrid Automatic Repeat Request Acknowledgement (HARQ-ACK), the attempt being subject to success or failure of a clear channel assessment (CCA). When the CCA fails and when the signal indicates activation, refraining from CSI measurement and reporting unless CCA subsequently succeeds before expiry of a time interval. When the CCA fails and when the signal indicates deactivation, continuing CSI measurement but refraining from CSI reporting unless CCA subsequently succeeds before expiry of a time interval.

According to this aspect, in some embodiments, the method further includes when the received signal indicates activation and the time interval has expired, refraining from CSI measurement and reporting until a next signal indicating activation is received; and when the received signal indicates deactivation and the time interval has expired, resuming CSI reporting until a next signal indicating deactivation is received. In some embodiments, the time interval is a multiple of a CSI reporting period. In some embodiments, the time interval is based at least in part on a count of a number of failed HARQ transmission attempts. In some embodiments, the time interval is configured by the network node. In some embodiments, when a deactivation command is received and the WD transmits the HARQ-ACK, the method further includes stopping a timer of the timing interval. In some embodiments, while a timer of the timing interval continues to run, the method further includes delaying a CSI report to the network node. In some embodiments, while a timer of the timing interval is running and the WD cannot transmit the HARQ-ACK response to the received signal, the method further includes restarting the timer. In some embodiments, when the timing interval expires and a counter of attempts reaches a maximum value, the method further includes restarting a CSI measurement period. In some embodiments, when a CSI report is not transmitted before a deactivation indication is received due to CCA failure, refraining from transmitting the CSI report and resetting a timer of the time interval.

According to another aspect, a WD is configured to communicate with a network node. The WD includes a radio interface configured to receive a signal indicating activation or deactivation of semi-persistent channel state information, CSI, reporting. The WD further includes processing circuitry configured to, in response to receiving the signal: attempt to transmit a Hybrid Automatic Repeat Request Acknowledgement, HARQ-ACK, the attempt being subject to success or failure of a clear channel assessment, CCA. When the CCA fails, then: when the received signal indicates activation, refrain from CSI measurement and reporting unless CCA subsequently succeeds before expiry of a time interval; and when the received signal indicates deactivation, continue CSI measurement but refraining from CSI reporting unless CCA subsequently succeeds before expiry of a time interval.

According to this aspect, in some embodiments, the processing circuitry is further configured to: when the received signal indicates activation and the time interval has expired, refrain from CSI measurement and reporting until a next signal indicating deactivation is received; and when the received signal indicates deactivation and the time interval has expired, resume CSI reporting until a next signal indicating deactivation is received. In some embodiments, the time interval is a multiple of a CSI reporting period. In some embodiments, the time interval is based at least in part on a count of a number of failed HARQ transmit attempts. In some embodiments, the time interval is configured by the network node. In some embodiments, when a deactivation command is received and the WD transmits the HARQ-ACK, the processing circuitry is further configured to stop a timer of the timing interval. In some embodiments, while a timer of the timing interval continues to run, the processing circuitry if further configured to delay a CSI report to the network node. In some embodiments, while a timer of the timing interval is running and the WD cannot transmit the HARQ-ACK responsive to the received signal, the processing circuitry is further configured to restart the timer. In some embodiments, when the timing interval expires and a counter of attempts reaches a maximum value, the processing circuitry is further configured to restart a CSI measurement period. In some embodiments, when a CSI report is not transmitted before a deactivation indication is received due to CCA failure, then the processing circuitry is further configured to refrain from transmitting the CSI report and reset a timer of the time interval.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

DETAILED DESCRIPTION

Figure 1:
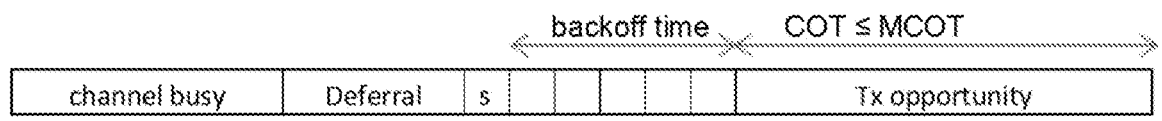
FIG. 1 is a timing diagram showing LTE LBT and COT.

Before describing in detail exemplary embodiments, it is noted that the embodiments reside primarily in combinations of apparatus components and processing steps related to semi-persistent channel state information (CSI) reporting procedures with uplink (UL) clear channel assessment (CCA). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The term "time resource" used herein may correspond to any type of physical resource or radio resource expressed in terms of length of time or time interval or time duration. Examples of time resources are: symbol, mini-slot, time slot, subframe, radio frame, transmission time interval (TTI), interleaving time, etc.

The term "TTI" used herein may correspond to any time period over which a physical channel can be encoded and interleaved for transmission. The physical channel is decoded by the receiver over the same time period (T0) over which it was encoded. The TTI may also interchangeably called a short TTI (sTTI), transmission time, slot, sub-slot, mini-slot, short subframe (SSF), mini-subframe, etc.

Unless explicitly stated, the term "LBT" used herein may comprise downlink (DL) LBT, uplink (UL) LBT, or both. DL LBT may be performed by a radio network node, while UL LBT may be performed by the WD. Hence, generically speaking, LBT may be performed by a radio node. The term "LBT category" or "LBT type" refers to a set of parameters characterizing LBT procedure, including: LBT categories described above, LBT with different switching delays between UL and DL (e.g., up to 16 μs, longer than 16 but shorter than 25, or 25 μs and above), beam-based LBT (LBT in a specific direction) or omni-directional LBT, different LBT approaches in the frequency domain (e.g., subband-specific, wideband LBT over multiple contiguous subbands, wideband LBT over multiple non-contiguous subbands, etc.), LBT with or without shared COT (shared COT is, e.g., when the COT is initiated by gNB and the transmitting within the COT without performing LBT), single-subband or multi-subband or wideband LBT. LBT is also interchangeably and more generally called clear channel assessment (CCA), carrier sense multiple access (CSMA), a channel assessment scheme, etc. The CCA based operation is more generally called contention-based operation. The transmission of signals on a carrier subjected to CCA is also called contention-based transmission. The contention-based operation is typically used for transmission on carriers of an unlicensed frequency band. But this mechanism may also be applied for operating on carriers belonging to a licensed band for example, to reduce interference. The transmission of signals on a carrier which is not subjected to CCA is also called contention free transmission.

The term "DRS" is used herein to refer to one or more signals transmitted by a radio network node. DRS may comprise, e.g., SSB (for example as defined in 3GPP TS 38.133), PSS/SSS, PBCH, CSI-RS, RMSI-CORESET(s), RMSI-PDSCH(s), Other System Information (OSI), paging, etc.

The embodiments are described for NR-U. However, the embodiments are applicable to any other radio access technology (RAT) or multi-RAT systems, where a WD receives and/or transmit signals (e.g., data), including NR, LTE frequency division or time division duplex (FDD/TDD), LTE LAA and its enhancements, wideband code division multiple access (WCDMA)/high speed packet access (HSPA), Wi-Fi, IEEE 802.11a/b/n/ah/ac/ax, wireless local area network (WLAN), LTE, Fifth Generation (5G), any NR (standalone or non-standalone), etc.

A CCA detection method is used, and it is referred to as a method for performing or evaluating the CCA to find out whether no other nodes are actually transmitting at the time when a transmitting node attempts to transmit the signal. Some embodiments provide semi-persistent channel state information (CSI) reporting procedures with uplink (UL) clear channel assessment (CCA).

Figure 2:
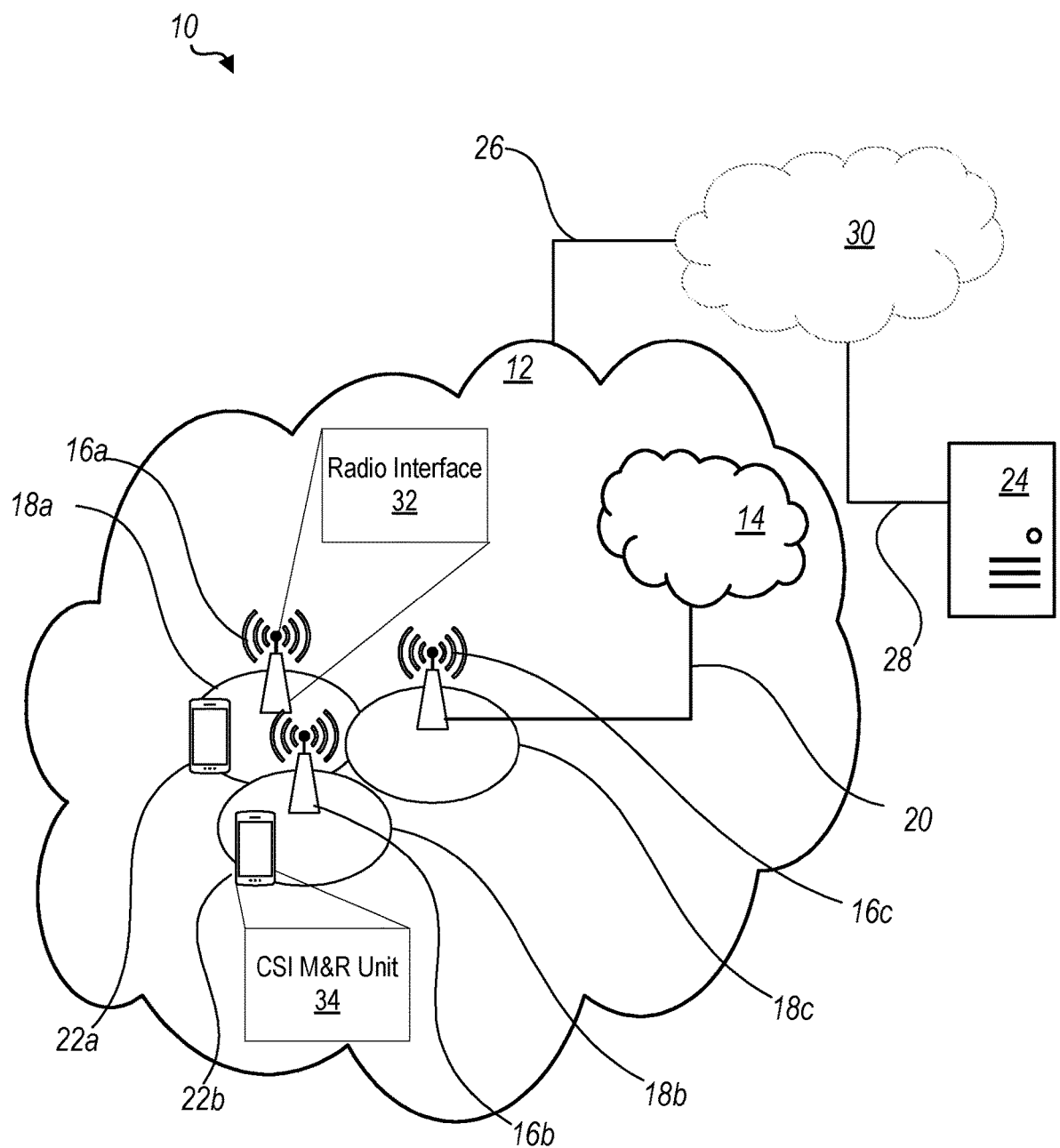
FIG. 2 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a radio interface 32 which is configured to transmit a signal to cause a WD 22 to activate or deactivate semi-persistent CSI reporting. A wireless device 22 is configured to include CSI Measurement and Reporting (M&R) unit 34 which is configured to continue or refrain from measurement and reporting during a time interval.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as radio interface 32 for setting up and maintaining at least a wireless connection 64 with a WD 22 located in a coverage area 18 served by the network node 16. The radio interface 32 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. The network node 16 also includes radio interface 32 as already described and which is configured to transmit a signal to cause a WD 22 to activate or deactivate semi-persistent CSI reporting.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include CSI M&R unit 34 which is configured to continue or refrain from measurement and reporting during a time interval.

In some embodiments, the inner workings of the network node 16, WD 22, and host computer 24 may be as shown in FIG. 2 and independently, the surrounding network topology may be that of FIG. 2.

Figure 3:
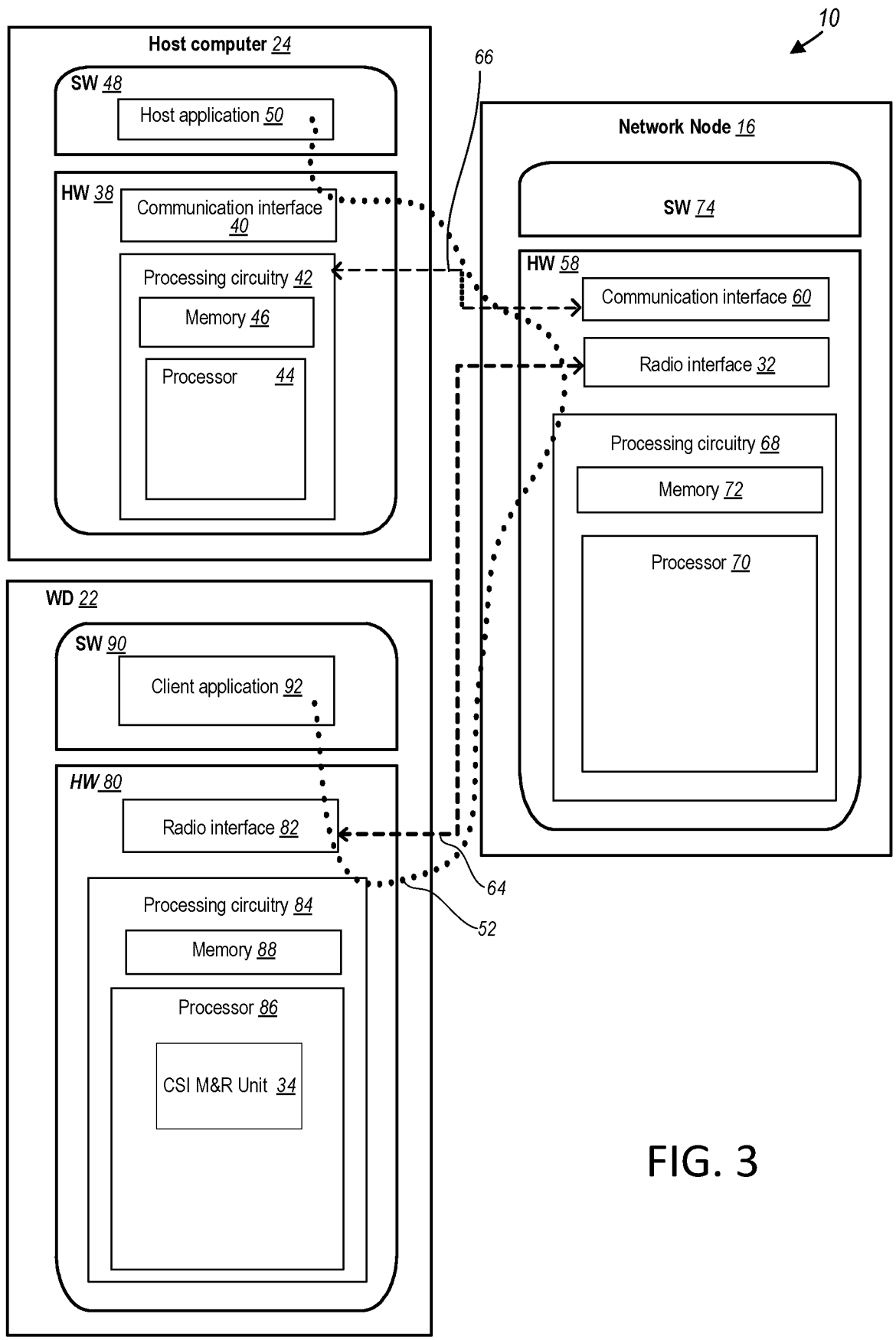
FIG. 3 is a block diagram of a host computer communicating via a network node with a wireless device over an at least partially wireless connection according to some embodiments of the present disclosure.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 32. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as CSI M&R unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
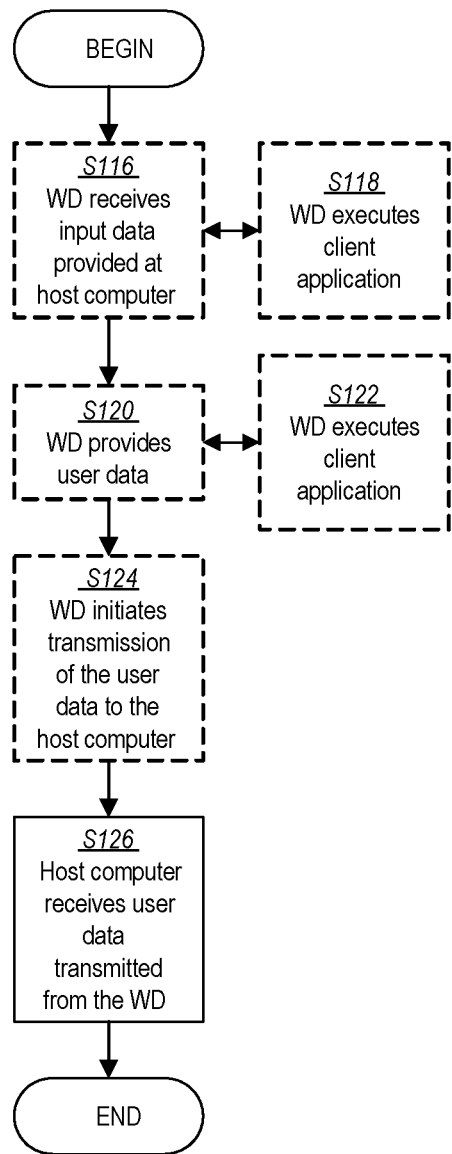
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
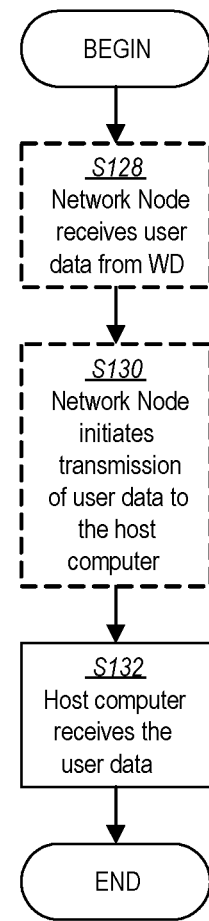
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
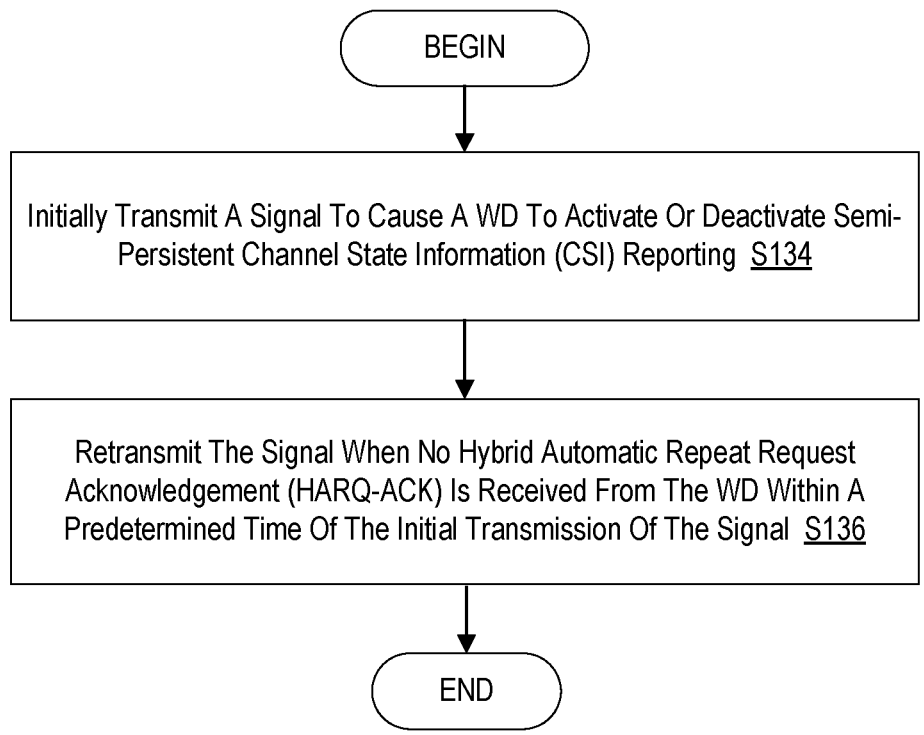
FIG. 8 is a flowchart of an exemplary process in a network node for semi-persistent channel state information (CSI) reporting procedures with uplink (UL) clear channel assessment (CCA)

FIG. 8 is a flowchart of an exemplary process in a network node 16 for semi-persistent channel state information (CSI) reporting procedures with uplink (UL) clear channel assessment (CCA). One or more blocks described herein may be performed by one or more elements of network node 16 such as by one or more of processing circuitry 68, processor 70, radio interface 32 and/or communication interface 60. Network node 16 such as via processing circuitry 68 and/or processor 70 and/or radio interface 32 and/or communication interface 60 is configured to initially transmit a signal to cause a WD to activate or deactivate semi-persistent channel state information (CSI) reporting (Block S134). The process also includes retransmitting the signal when no Hybrid Automatic Repeat Request Acknowledgement (HARQ-ACK) is received from the WD within a predetermined time of the initial transmission of the signal (Block S136).

Figure 9:
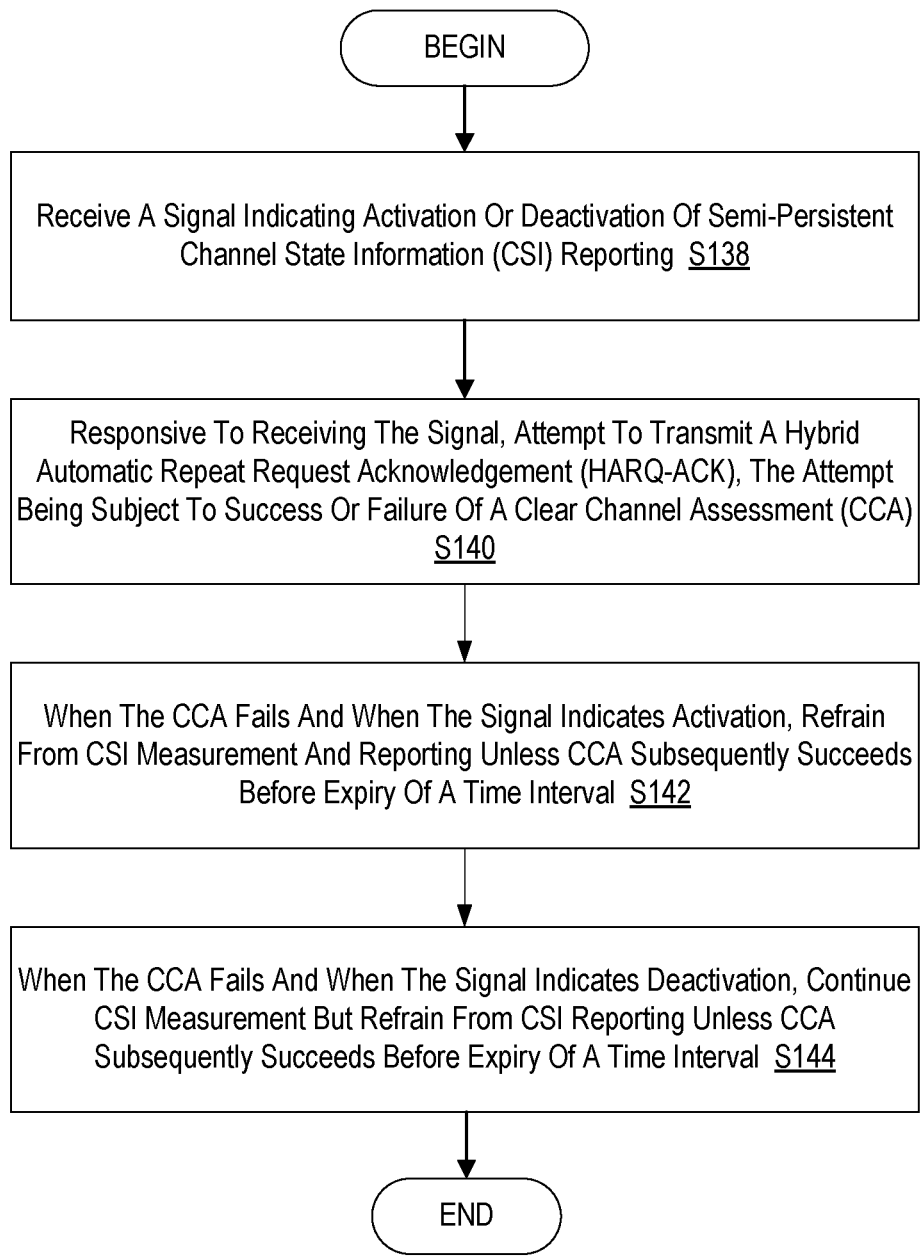
FIG. 9 is a flowchart of an exemplary process in a wireless device for semi-persistent channel state information (CSI) reporting procedures with uplink (UL) clear channel assessment (CCA)

FIG. 9 is a flowchart of an exemplary process in a wireless device 22 according to some embodiments of the present disclosure One or more blocks described herein may be performed by one or more elements of wireless device 22 such as by one or more of processing circuitry 84 (including the CSI M&R unit 34), processor 86, radio interface 82 and/or communication interface 60. Wireless device 22 such as via processing circuitry 84 and/or processor 86 and/or radio interface 82 is configured to receive a signal indicating activation or deactivation of semi-persistent channel state information (CSI) reporting (Block S138). The process also includes, responsive to receiving the signal, attempting to transmit a Hybrid Automatic Repeat Request Acknowledgement (HARQ-ACK), the attempt being subject to success or failure of a clear channel assessment (CCA) (Block S140). The process also includes, when the CCA fails and when the signal indicates activation, refraining from CSI measurement and reporting unless CCA subsequently succeeds before expiry of a time interval (Block S142). When the CCA fails and when the signal indicates deactivation, the process includes continuing CSI measurement but refraining from CSI reporting unless CCA subsequently succeeds before expiry of a time interval (Block S144).

Having described the general process flow of arrangements of the disclosure and having provided examples of hardware and software arrangements for implementing the processes and functions of the disclosure, the sections below provide details and examples of arrangements for semi-persistent channel state information (CSI) reporting procedures with uplink (UL) clear channel assessment (CCA).

Scenario

In one scenario, at least one WD 22 operates in a coverage area 18 served or managed by a network node 16 and configured with the channel state information (CSI) resources for CSI measurement and semi-persistent CSI reporting of coverage area 18. For example, coverage area 18 can be any type of serving cell e.g., a special cell (SpCell), secondary cell (SCell), etc. Examples of a SpCell include a primary cell (Pcell), or special cell of a secondary cell group (PSCell), etc. Assume that coverage area 18 is operating on a carrier frequency belonging to the unlicensed spectrum where the channel access is subject to CCA, i.e., the transmitting node performs carrier sensing before transmitting any signals or channels. In other words, all types of signals/channels transmitted by both the WD 22 and the network node 16 in coverage area 18 are subject to CCA. Thus, the signals/channels may not always be transmitted due to high channel occupancy resulting in CCA failure at the transmitting node and may not be received at the receiving node.

Activation of Semi-Persistent CSI Reporting

In some embodiments, the WD 22 is configured with the CSI measurement resources and is also configured with the semi-persistent CSI reporting. Both the CSI measurement resources configuration and the semi-persistent CSI reporting configuration may be configured by higher layer signaling, e.g., radio resource control (RRC) signaling. In this configuration, the network node 16 may also determine whether the semi-persistent reporting is based on the PUCCH or the PUSCH.

If the network node 16 requires the semi-persistent CSI reporting, the network node 16 may transmit a MAC CE on the PDSCH to activate the semi-persistent CSI reporting.

When the WD 22 receives the MAC CE, the WD 22 may attempt to transmit a HARQ-ACK on the PUCCH or the PUSCH to confirm the reception of the MAC CE. Before the transmission of the HARQ-ACK, the WD 22 may perform CCA to be able to transmit UL signals. In the case of CCA success, the WD 22 may transmit the HARQ-ACK on the scheduled slot and start CSI measurement and report processing. In the case of CCA failure, on the other hand, the WD 22 might not transmit the HARQ-ACK and instead may start a counter with a maximum value C1 and/or timer with value T1. An example of T1 is L1 times the configured CSI reporting period, e.g., L1=1, 2, 3 . . . . An example counter C1 is used to count the number of failures to transmit the HARQ feedback. T1 and C1 can be fixed and pre-defined, determined based on a pre-defined rule, or configured by the network node 16.

Figure 10:
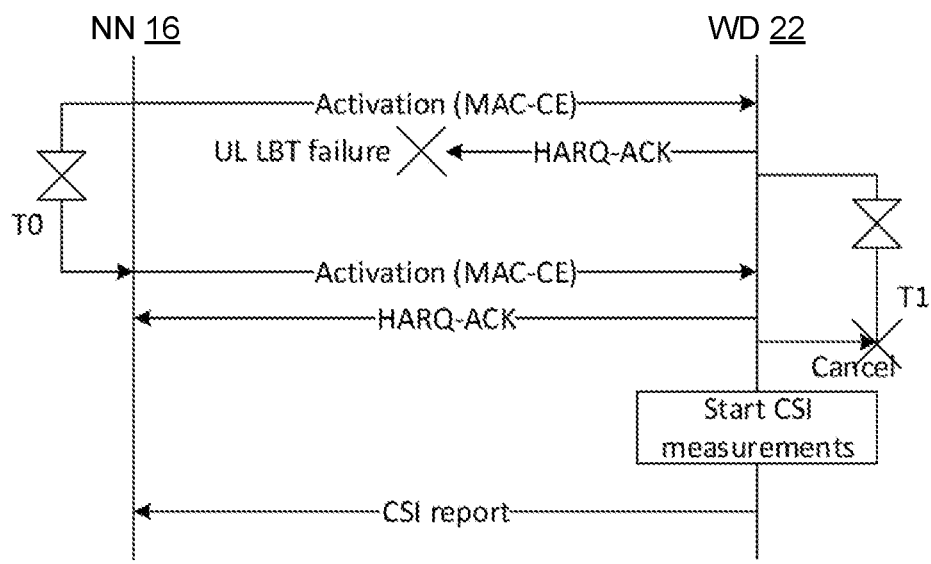
FIG. 10 illustrates a procedure for activation of semi-persistent CSI reporting.

If the network node 16 does not receive the HARQ-ACK within the expected time, e.g., T0, it may resend the activation command with, for example, a MAC CE, while the T1 timer and/or counter is running. The WD 22 can receive the activation command and transmit the HARQ-ACK to the network node 16 (if needed, e.g., depending on how the retransmitted activation command was received), then the WD 22 stops the timer T1 and/or counter (whichever was running) and starts the CSI measurement and reports according to the configuration. FIG. 10 illustrates this procedure.

While the timer T1 and/or counter is running, if the WD 22 can receive the activation command but cannot transmit the HARQ-ACK to the network node 16, then the WD 22 does not start the CSI measurement and reporting. In this case, the WD 22 restarts the timer T1 and resets the counter C1, or the WD 22 keeps running the timer T1 and counter C1.

Figure 11:
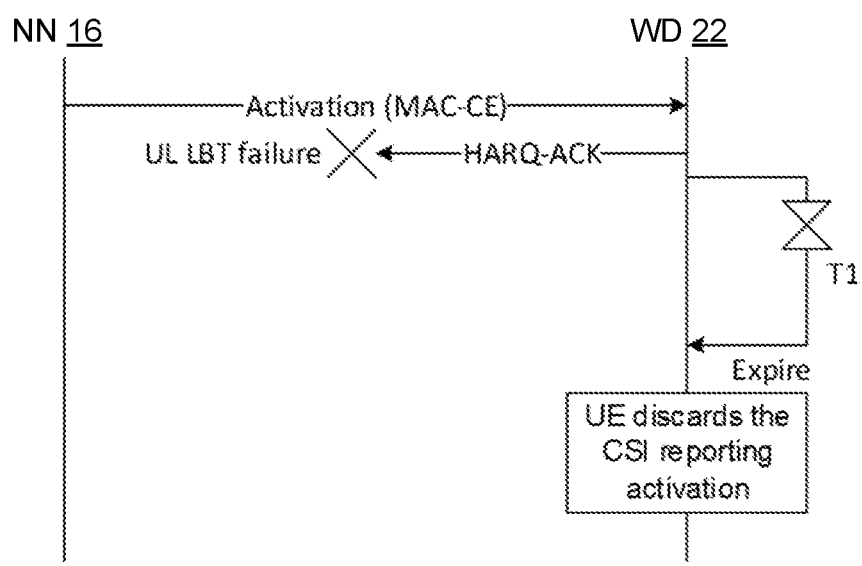
FIG. 11 illustrates activation procedure abandonment.

If the WD 22 does not receive an additional activation command or is not able to transmit the feedback until the timer T1 is expired and/or the counter C1 reaches the maximum, the WD 22 may not start CSI measurement and reporting and the WD 22 may abandon the activation command. FIG. 11 illustrates this procedure.

An alternative approach can be that the network node 16 initiates a COT to be shared with the WD 22 and sends the activation command within this COT so that the WD 22 does not need to perform CCA (e.g., with channel access category 1) prior to transmitting the HARQ feedback and sends the HARQ feedback in the UL within the same COT.

Deactivation of Semi-Persistent CSI Reporting

If the network node 16 deactivates the ongoing semi-persistent CSI report, the network node 16 may transmit the MAC CE on the PDSCH to deactivate the semi-persistent CSI reporting. When the WD 22 receives the MAC CE, the WD 22 attempts to transmit the HARQ-ACK on the PUCCH or the PUSCH to confirm the reception of the MAC CE. Before the transmission of the HARQ-ACK, the WD 22 performs CCA in the UL. In case CCA is successful, the WD 22 may transmit the HARQ-ACK on the scheduled slot and stop the CSI measurement and reporting process. In case of CCA failure, on the other hand, the WD 22 might not transmit the HARQ-ACK and may start a timer with T2 and/or counter C2. An example of T2 is L2 times of configured CSI reporting period, e.g., L2=1, 2, 3 . . . An example of counter C2 is to count the number of failures to transmit the HARQ feedback. T2 and C2 can be fixed and pre-defined, determined based on a pre-defined rule, or configured by network node 16.

Figure 12:
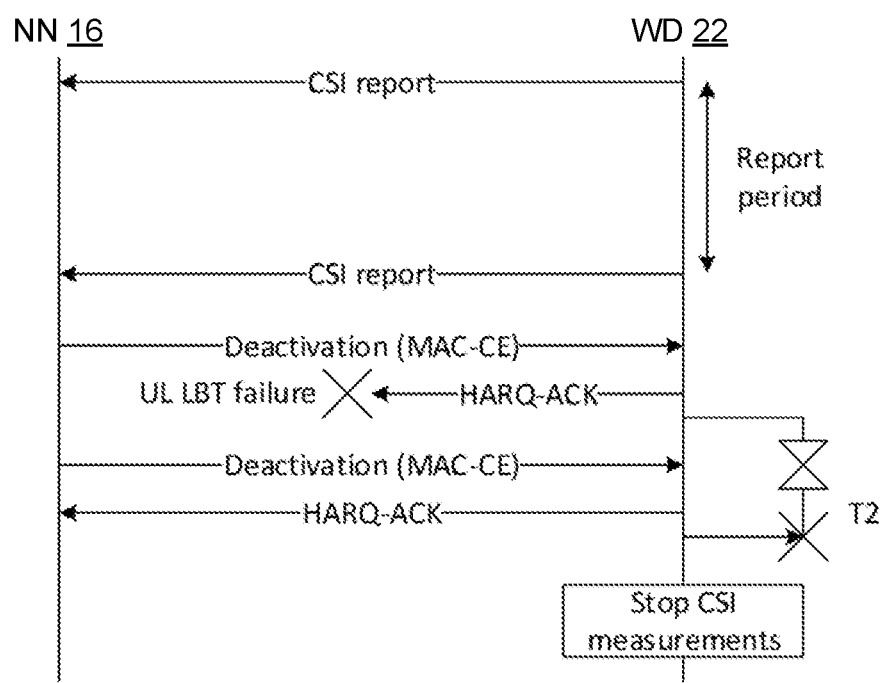
FIG. 12 illustrates a procedure for deactivation of semi-persistent CSI reporting.

If network node 16 resends the deactivation command with MAC CE during the period while T2 timer and/or counter C2 is running, and WD 22 can receive the deactivation command and transmit HARQ-ACK to the network node 16, then the WD 22 may stop the timer T2 and/or stop counting C2, and may stop the CSI measurement and reporting (i.e., implements the deactivation command). FIG. 12 illustrates this procedure.

Figure 13:
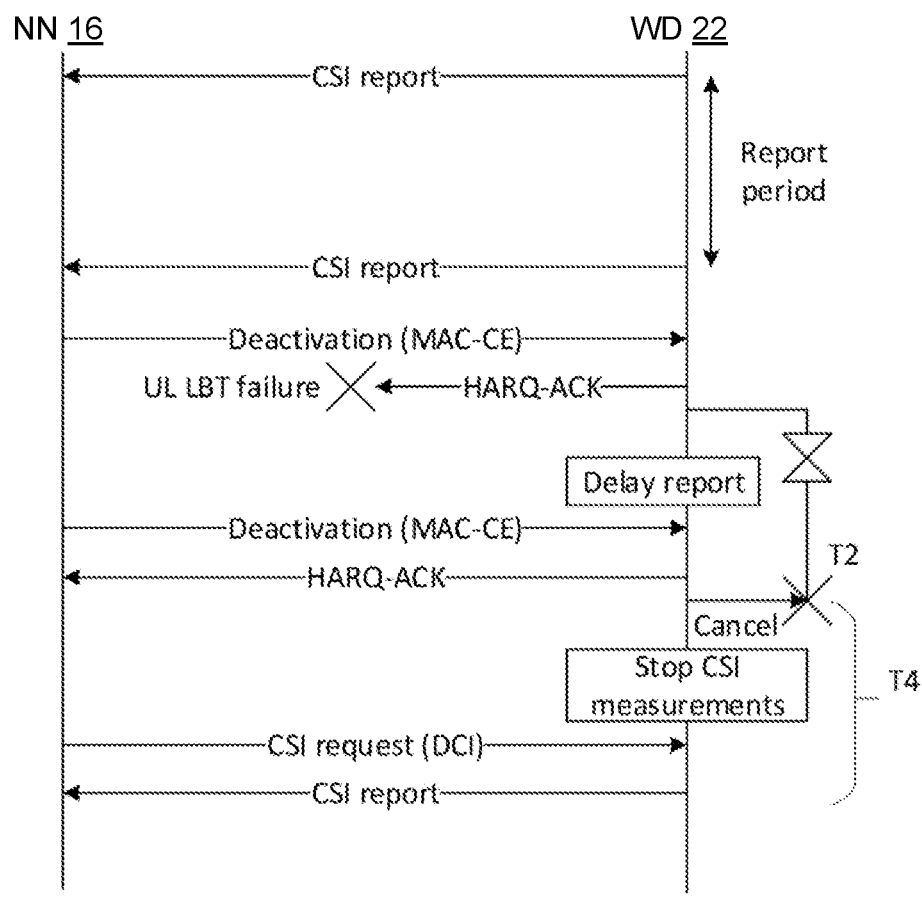
FIG. 13 illustrates a procedure for transmitting stored CSI reports.

In another embodiment, if network node 16 resends the deactivation command with a MAC CE while the T2 timer and/or counter C2 is running, and the WD 22 can receive the deactivation command and transmit the HARQ-ACK to the network node 16, then the WD 22 stops the timer T2 and/or counter C2. An example of T2 is L2 times of CSI report period, e.g. L2=2. An example of counter C2 is to count the number of failures to transmit the HARQ feedback. T2 and C2 can be fixed and pre-defined, determined based on a pre-defined rule, or configured by network node 16. While the timer T2 is running, the WD 22 may delay the CSI report, i.e., the WD 22 continues the CSI measurement but does not report to the network node 16. After T2 expires or the counter C2 reaches the maximum value, the WD 22 keeps the measured CSI for the period T4. An example of T4 is L4 times the CSI report period, e.g., L4=3. During the period of T4, if the network node 16 requests the CSI reporting, e.g., transmits a CSI request with DCI on the PDCCH, then the WD 22 may transmit the stored CSI reports. FIG. 13 illustrates this procedure.

While the timer T2 is running, if the WD 22 cannot transmit HARQ-ACK responsive to the re-deactivation commands, then the WD 22 may restart the timer T2 or the WD 22 may keep T2 running.

Figure 14:
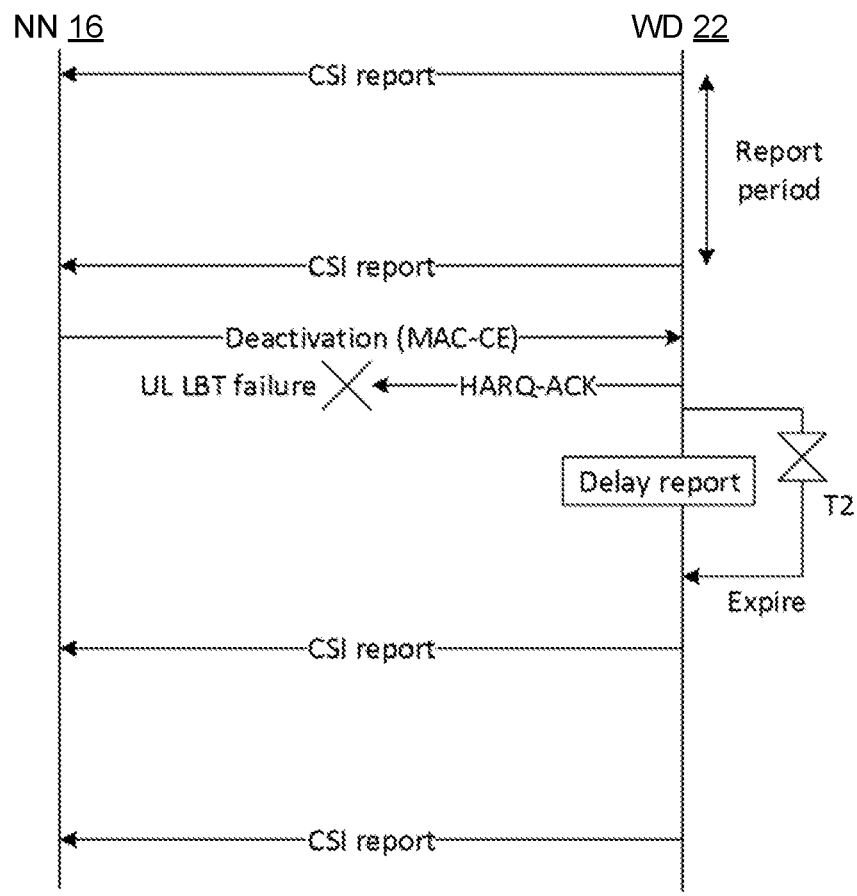
FIG. 14 illustrates a procedure for restarting CSI measurement and reporting.

If the timer T2 is expired and/or the counter C2 reaches the maximum, the WD 22 may then restart the CSI measurement and reporting procedure. See FIG. 14, for example.

CSI Reporting Failure after Activation

Consider the case when network node 16 sends the activation command to the WD 22 where the semi-persistent CSI reporting is configured by higher layer signaling, e.g., RRC signaling. For example, the network node 16 may send the activation command with a MAC CE on the PDSCH to the WD 22 and the WD 22 can transmit a HARQ-ACK with the PUCCH or the PUSCH with CCA successful in the UL. As another example, the network node 16 may send the CSI request with DCI on the PDCCH for activation. In this case, the WD 22 does not need to send a HARQ-ACK for the activation with DCI. For both cases, the WD 22 may start the CSI measurements.

Figure 15:
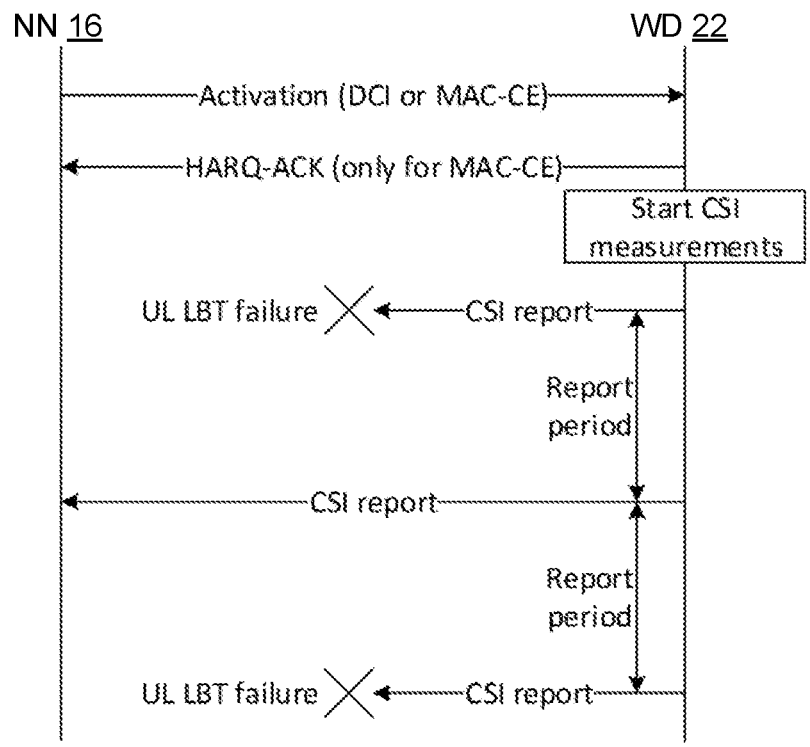
FIG. 15 illustrates a procedure for reporting failure after activation.

While the semi-persistent CSI reporting is activated, the WD 22 attempts to transmit the CSI reporting with the configured period after performing CCA. In case of CCA success, the WD 22 can transmit the measured CSI on the PUSCH or the PUCCH according to the configuration. In case of CCA failure, on the other hand, the WD 22 might not transmit the measured CSI and may continue the CSI measurement, i.e., the WD may not update CSI according to the CSI resource transmission period. FIG. 15 illustrates this procedure.

CSI Reporting Failure after Deactivation

In this case, the network node 16 sends the deactivation command to the WD 22 during the period when semi-persistent CSI reporting is activated for WD 22. In one example, the network node 16 sends the deactivation command with a MAC CE on the PDSCH to the WD 22 and the WD 22 can transmit a HARQ-ACK with the PUCCH or the PUSCH with CCA successful in the UL. In another example, the network node 16 sends the deactivation CSI request with DCI on the PDCCH. In this case, the WD 22 does not need to send a HARQ-ACK for the deactivation with DCI. For both cases, the WD 22 stops the CSI measurement process.

Figure 16:
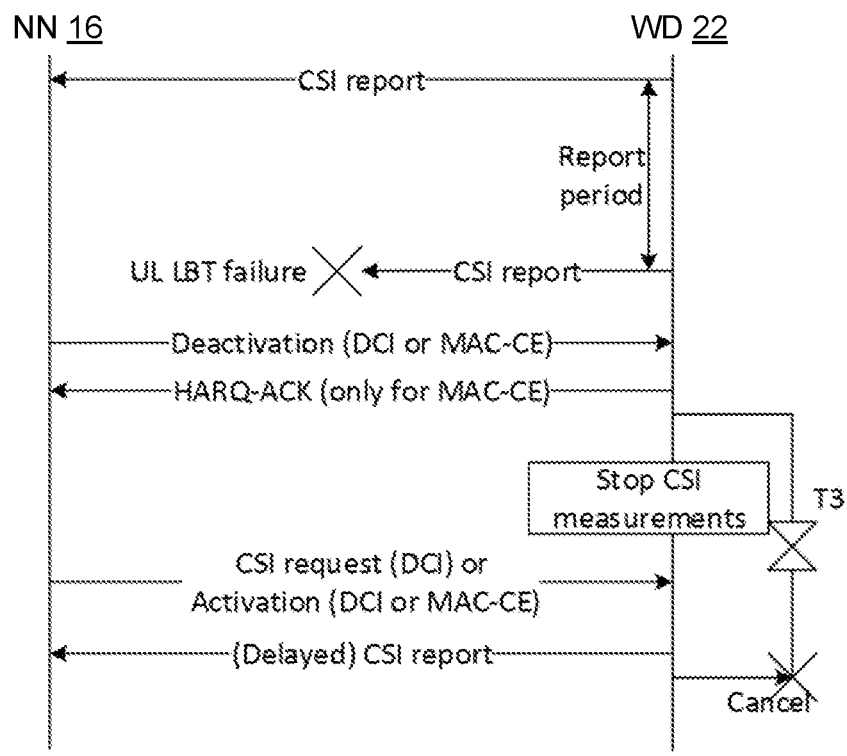
FIG. 16 illustrates a procedure for reporting failure after deactivation.

If the last CSI report before the reception of the deactivation command cannot be transmitted by the WD 22 due to the UL CCA failure, the WD 22 keeps the outstanding CSI (i.e., the CSI not transmitted) and starts the timer T3 and/or counter C3, e.g., at the time the WD 22 transmits a HARQ-ACK responsive to a MAC CE deactivation command or when the WD 22 receives the deactivation command on the PDCCH via DCI. If the network node 16 requests the CSI report while the timer T3 and/or counter C3 is running, the WD 22 may transmit the outstanding CSI (i.e., the stored CSI report). If the WD 22 can transmit the delayed CSI report, the WD 22 may stop the timer T3 and/or the counter C3. Example of T3 is L3 times the CSI report period, e.g., L3=3. An example of counter C3 is to count the number of failures to transmit the HARQ feedback. T3 and C3 can be fixed and pre-defined, determined based on a pre-defined rule, or configured by network node 16. FIG. 16 illustrates this procedure.

When the timer T3 is expired or the maximum value of the counter is reached, the WD 22 may drop the stored CSI report.

According to one aspect, a network node 16 is configured to communicate with a wireless device (WD) 22. The network node 16 includes a radio interface 32 and/or processing circuitry 68 configured to initially transmit a signal to cause a WD 22 to activate or deactivate semi-persistent channel state information (CSI) reporting, and retransmit the signal when no Hybrid Automatic Repeat Request Acknowledgement (HARQ-ACK) is received from the WD 22 within a predetermined time of the initial transmission of the signal. According to this aspect, in some embodiments, the signal is transmitted in a medium access control (MAC) control element (CE) carried on a physical downlink channel.

According to another aspect, a method implemented in a network node 16 includes initially transmitting a signal to cause a WD 22 to activate or deactivate semi-persistent channel state information (CSI) reporting, and retransmitting the signal when no Hybrid Automatic Repeat Request Acknowledgement (HARQ-ACK) is received from the WD 22 within a predetermined time of the initial transmission of the signal. According to this aspect, in some embodiments, the signal is transmitted in a medium access control (MAC) control element (CE) carried on a physical downlink channel.

According to yet another aspect, a wireless device (WD) 22 is configured to communicate with a network node 16. The WD 22 includes a radio interface 82 and/or processing circuitry 84 configured to receive a signal indicating activation or deactivation of semi-persistent channel state information (CSI) reporting and responsive to receiving the signal, attempt to transmit a Hybrid Automatic Repeat Request Acknowledgement (HARQ-ACK), the attempt being subject to success or failure of a clear channel assessment (CCA). When the CCA fails and when the signal indicates activation, the WD 22 refrains from CSI measurement and reporting unless CCA subsequently succeeds before expiry of a time interval. When the CCA fails and when the signal indicates deactivation, the WD 22 continues CSI measurement but refrains from CSI reporting unless CCA subsequently succeeds before expiry of a time interval.

According to this aspect, in some embodiments, the WD 22, radio interface 82, and/or processing circuitry 84 are further configured to: when the signal indicates activation and the time interval has expired, refrain from CSI measurement and reporting until a next signal indicating deactivation is received; and when the signal indicates deactivation and the time interval has expired, resume CSI reporting until a next signal indicating deactivation is received.

According to yet another aspect, a method implemented in a wireless device (WD) 22 includes receiving a signal indicating activation or deactivation of semi-persistent channel state information (CSI) reporting and responsive to receiving the signal, attempting to transmit a Hybrid Automatic Repeat Request Acknowledgement (HARQ-ACK), the attempt being subject to success or failure of a clear channel assessment (CCA). When the CCA fails and when the signal indicates activation, the method includes refraining from CSI measurement and reporting unless CCA subsequently succeeds before expiry of a time interval. When the CCA fails and when the signal indicates deactivation, the method includes continuing CSI measurement but refraining from CSI reporting unless CCA subsequently succeeds before expiry of a time interval.

According to this aspect, in some embodiments, the method further includes: when the signal indicates activation and the time interval has expired, refraining from CSI measurement and reporting until a next signal indicating deactivation is received; and when the signal indicates deactivation and the time interval has expired, resuming CSI reporting until a next signal indicating deactivation is received.

According to one aspect, a method in a wireless device (WD) 22 includes receiving a signal indicating activation or deactivation of semi-persistent channel state information (CSI) reporting. The method also includes, responsive to receiving the signal, attempting to transmit a Hybrid Automatic Repeat Request Acknowledgement (HARQ-ACK), the attempt being subject to success or failure of a clear channel assessment (CCA). When the CCA fails and when the signal indicates activation, refraining from CSI measurement and reporting unless CCA subsequently succeeds before expiry of a time interval. When the CCA fails and when the signal indicates deactivation, continuing CSI measurement but refraining from CSI reporting unless CCA subsequently succeeds before expiry of a time interval.

According to this aspect, in some embodiments, the method further includes when the received signal indicates activation and the time interval has expired, refraining from CSI measurement and reporting until a next signal indicating activation is received; and when the received signal indicates deactivation and the time interval has expired, resuming CSI reporting until a next signal indicating deactivation is received. In some embodiments, the time interval is a multiple of a CSI reporting period. In some embodiments, the time interval is based at least in part on a count of a number of failed HARQ transmission attempts. In some embodiments, the time interval is configured by the network node 16. In some embodiments, when a deactivation command is received and the WD 22 transmits the HARQ-ACK, the method further includes stopping a timer of the timing interval. In some embodiments, while a timer of the timing interval continues to run, the method further includes delaying a CSI report to the network node 16. In some embodiments, while a timer of the timing interval is running and the WD 22 cannot transmit the HARQ-ACK response to the received signal, the method further includes restarting the timer. In some embodiments, when the timing interval expires and a counter of attempts reaches a maximum value, the method further includes restarting a CSI measurement period. In some embodiments, when a CSI report is not transmitted before a deactivation indication is received due to CCA failure, refraining from transmitting the CSI report and resetting a timer of the time interval.

According to another aspect, a WD 22 is configured to communicate with a network node 16. The WD 22 includes a radio interface 82 configured to receive a signal indicating activation or deactivation of semi-persistent channel state information, CSI, reporting. The WD 22 further includes processing circuitry 84 configured to, in response to receiving the signal: attempt to transmit a Hybrid Automatic Repeat Request Acknowledgement, HARQ-ACK, the attempt being subject to success or failure of a clear channel assessment, CCA. When the CCA fails, then: when the received signal indicates activation, refrain from CSI measurement and reporting unless CCA subsequently succeeds before expiry of a time interval; and when the received signal indicates deactivation, continue CSI measurement but refraining from CSI reporting unless CCA subsequently succeeds before expiry of a time interval.

According to this aspect, in some embodiments, the processing circuitry 84 is further configured to: when the received signal indicates activation and the time interval has expired, refrain from CSI measurement and reporting until a next signal indicating deactivation is received; and when the received signal indicates deactivation and the time interval has expired, resume CSI reporting until a next signal indicating deactivation is received. In some embodiments, the time interval is a multiple of a CSI reporting period. In some embodiments, the time interval is based at least in part on a count of a number of failed HARQ transmit attempts. In some embodiments, the time interval is configured by the network node 16. In some embodiments, when a deactivation command is received and the WD 22 transmits the HARQ-ACK, the processing circuitry 84 is further configured to stop a timer of the timing interval. In some embodiments, while a timer of the timing interval continues to run, the processing circuitry if further configured to delay a CSI report to the network node 16. In some embodiments, while a timer of the timing interval is running and the WD 22 cannot transmit the HARQ-ACK responsive to the received signal, the processing circuitry 84 is further configured to restart the timer. In some embodiments, when the timing interval expires and a counter of attempts reaches a maximum value, the processing circuitry 84 is further configured to restart a CSI measurement period. In some embodiments, when a CSI report is not transmitted before a deactivation indication is received due to CCA failure, then the processing circuitry 84 is further configured to refrain from transmitting the CSI report and reset a timer of the time interval.

Some embodiments include the following:

Embodiment A1. A network node configured to communicate with a wireless device (WD), the network node configured to, and/or comprising a radio interface and/or comprising processing circuitry configured to:
  initially transmit a signal to cause a WD to activate or deactivate semi-persistent channel state information (CSI) reporting; and
  retransmit the signal when no Hybrid Automatic Repeat Request Acknowledgement (HARQ-ACK) is received from the WD within a predetermined time of the initial transmission of the signal.

Embodiment A2. The network node of Embodiment A1, wherein the signal is transmitted in a medium access control (MAC) control element (CE) carried on a physical downlink channel.

Embodiment B1. A method implemented in a network node, the method comprising:
  initially transmitting a signal to cause a WD to activate or deactivate semi-persistent channel state information (CSI) reporting; and
  retransmitting the signal when no Hybrid Automatic Repeat Request Acknowledgement (HARQ-ACK) is received from the WD within a predetermined time of the initial transmission of the signal.

Embodiment B2. The method of Embodiment B1, wherein the signal is transmitted in a medium access control (MAC) control element (CE) carried on a physical downlink channel.

Embodiment C1. A wireless device (WD) configured to communicate with a network node, the WD configured to, and/or comprising a radio interface and/or processing circuitry configured to:
  receive a signal indicating activation or deactivation of semi-persistent channel state information (CSI) reporting;
  responsive to receiving the signal, attempt to transmit a Hybrid Automatic Repeat Request Acknowledgement (HARQ-ACK), the attempt being subject to success or failure of a clear channel assessment (CCA); and
  when the CCA fails and:
    when the signal indicates activation, refrain from CSI measurement and reporting unless CCA subsequently succeeds before expiry of a time interval; and
    when the signal indicates deactivation, continue CSI measurement but refrain from CSI reporting unless CCA subsequently succeeds before expiry of a time interval.

Embodiment C2. The WD of Embodiment C1, wherein the WD, radio interface, and/or processing circuitry are further configured to:
  when the signal indicates activation and the time interval has expired, refrain from CSI measurement and reporting until a next signal indicating deactivation is received; and
  when the signal indicates deactivation and the time interval has expired, resume CSI reporting until a next signal indicating deactivation is received.

Embodiment D1. A method implemented in a wireless device (WD), the method comprising:
  receiving a signal indicating activation or deactivation of semi-persistent channel state information (CSI) reporting;
  responsive to receiving the signal, attempting to transmit a Hybrid Automatic Repeat Request Acknowledgement (HARQ-ACK), the attempt being subject to success or failure of a clear channel assessment (CCA); and
  when the CCA fails and:
    when the signal indicates activation, refraining from CSI measurement and reporting unless CCA subsequently succeeds before expiry of a time interval; and
    when the signal indicates deactivation, continuing CSI measurement but refraining from CSI reporting unless CCA subsequently succeeds before expiry of a time interval.

Embodiment D2. The method of Embodiment D1, further comprising:
  when the signal indicates activation and the time interval has expired, refraining from CSI measurement and reporting until a next signal indicating deactivation is received; and when the signal indicates deactivation and the time interval has expired, resuming CSI reporting until a next signal indicating deactivation is received.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| ACK | Acknowledged |
| BS | Base station |
| BWP | Bandwidth part |
| CE | Control element |
| CORESET | Control resource set |
| COT | Channel Occupancy Time |
| CQI | Channel quality indicator |
| CRI | CSI-RS resource indicator |
| CRS | Cell-specific reference signals |
| CSI | Channel state information |
| CSI-RS | Channel state information reference signals |
| DCI | Downlink control information |
| DL | Downlink |
| DRS | Discovery reference signals |
| eLAA | Enhanced LAA |
| FBE | Frame Based Equipment |
| FDD | Frequency division duplex |
| FR1 | Frequency range 1 |
| FR2 | Frequency range 2 |
| GC-PDCCH | Group-common PDCCH |
| gNB | Next generation Node B |
| HARQ | Hybrid automatic repeat request |
| HSPA | High speed packet access |
| L1-RSRP | Layer 1 reference signal received power |
| LAA | License assisted access |
| LAA | Licensed-Assisted Access |
| LBE | Load Based Equipment |
| LBT | Listen Before Talk |
| LTE | Long term evolution |
| MAC | Medium access control |
| MAC CE | Medium access control - control element |
| MCOT | Maximum COT |
| MCS | Modulation and coding scheme |
| NACK | Not acknowledged |
| NR | New radio |
| NR-U | NR unlicensed |
| OSI | Other system information |
| PBCH | Physical broadcast channel |
| PDCCH | Physical downlink control channel |
| PDSCH | Physical downlink shared channel |
| PMI | Precoding matrix indicator |
| PSS | Primary synchronization signal |
| PUCCH | Physical uplink control channel |
| PUSCH | Physical uplink shared channel |

-continued

| Abbreviation | Explanation |
|---|---|
| QCI | Quasi co-location |
| RACH | Random access channel |
| RAT | Radio access technology |
| RI | Rank indicator |
| RMSI | Remaining minimum system information |
| RRC | Radio resource control |
| SCH | Shared channel |
| SNR | Signal to noise ratio |
| SRS | Sounding reference signal |
| SSS | Secondary synchronization signal |
| TCI | Transmission configuration indicator |
| TDD | Time division duplex |
| UCI | Uplink control information |
| UE | User equipment |
| UL | Uplink |
| WCDMA | Wide-band code division multiple access |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:
    receiving a signal indicating activation or deactivation of semi-persistent channel state information, CSI, reporting;
    responsive to receiving the signal, attempting to transmit a Hybrid Automatic Repeat Request Acknowledgement (HARQ-ACK), the attempt being subject to success or failure of a clear channel assessment, CCA; and
    when the CCA fails and:
        when the signal indicates activation, refraining from CSI measurement and reporting unless CCA subsequently succeeds before expiry of a time interval; and
        when the signal indicates deactivation, continuing CSI measurement but refraining from CSI reporting unless CCA subsequently succeeds before expiry of a time interval.

2. The method of claim 1, further comprising:
    when the received signal indicates activation and the time interval has expired, refraining from CSI measurement and reporting until a next signal indicating activation is received; and
    when the received signal indicates deactivation and the time interval has expired, resuming CSI reporting until a next signal indicating deactivation is received.

3. The method of claim 1, wherein the time interval is a multiple of a CSI reporting period.

4. The method of claim 1, wherein the time interval is based at least in part on a count of a number of failed HARQ transmission attempts.

5. The method of claim 1, wherein the time interval is configured by the network node.

6. The method of claim 1, wherein, when a deactivation command is received and the WD transmits the HARQ-ACK, then stopping a timer of the timing interval.

7. The method of claim 1, wherein, while a timer of the timing interval continues to run, delaying a CSI report to the network node.

8. The method of claim 1, wherein, while a timer of the timing interval is running and the WD cannot transmit the HARQ-ACK response to the received signal, restarting the timer.

9. The method of claim 1, wherein, when the timing interval expires and a counter of attempts reaches a maximum value, restarting a CSI measurement period.

10. The method of claim 1, wherein, when a CSI report is not transmitted before a deactivation indication is received due to CCA failure, refraining from transmitting the CSI report and resetting a timer of the time interval.

11. A wireless device, WD, configured to communicate with a network node, the WD comprising:
    a radio interface configured to receive a signal indicating activation or deactivation of semi-persistent channel state information, CSI, reporting; and
    processing circuitry configured to, in response to receiving the signal:
        attempt to transmit a Hybrid Automatic Repeat Request Acknowledgement, HARQ-ACK, the attempt being subject to success or failure of a clear channel assessment, CCA, and
        when the CCA fails and:
            when the received signal indicates activation, refrain from CSI measurement and reporting unless CCA subsequently succeeds before expiry of a time interval; and
            when the received signal indicates deactivation, continue CSI measurement but refraining from CSI reporting unless CCA subsequently succeeds before expiry of a time interval.

12. The WD of claim 11, wherein the processing circuitry is further configured to:
    when the received signal indicates activation and the time interval has expired, refrain from CSI measurement and reporting until a next signal indicating deactivation is received; and
    when the received signal indicates deactivation and the time interval has expired, resume CSI reporting until a next signal indicating deactivation is received.

13. The WD of claim 11, wherein the time interval is a multiple of a CSI reporting period.

14. The WD of claim 11, wherein the time interval is based at least in part on a count of a number of failed HARQ transmit attempts.

15. The WD of claim 11, wherein the time interval is configured by the network node.

16. The WD of claim 11, wherein, when a deactivation command is received and the WD transmits the HARQ-ACK, the processing circuitry is further configured to stop a timer of the timing interval.

17. The WD of claim 11, wherein, while a timer of the timing interval continues to run, the processing circuitry if is further configured to delay a CSI report to the network node.

18. The WD of claim 11, wherein, while a timer of the timing interval is running and the WD cannot transmit the HARQ-ACK responsive to the received signal, the processing circuitry is further configured to restart the timer.

19. The WD of claim 11, wherein, when the timing interval expires and a counter of attempts reaches a maximum value, the processing circuitry is further configured to restart a CSI measurement period.

20. The WD of claim 11, wherein, when a CSI report is not transmitted before a deactivation indication is received due to CCA failure, then the processing circuitry is further configured to refrain from transmitting the CSI report and reset a timer of the time interval.

* * * * *